United States Patent [19]

Tuneblom

[11] 4,266,884
[45] May 12, 1981

[54] RESILIENTLY MOUNTED STEERING YOKE FOR ROAD ROLLER

[75] Inventor: Eskil Tuneblom, Mount Arlington, N.J.

[73] Assignee: Dynapac Maskin AB, Solna, Sweden

[21] Appl. No.: 36,284

[22] Filed: May 7, 1979

[51] Int. Cl.³ .............................................. E01C 19/26
[52] U.S. Cl. ..................................... 404/122; 180/20; 280/97
[58] Field of Search ............... 404/122, 124, 125, 117; 180/20; 280/97, 131

[56] References Cited

U.S. PATENT DOCUMENTS

| | | | |
|---|---|---|---|
| 1,637,208 | 7/1927 | Wilson | 404/126 |
| 2,169,916 | 8/1939 | Keeler | 180/20 |
| 2,208,599 | 7/1940 | Ronning | 280/97 |
| 2,273,630 | 2/1942 | Dunham | 280/97 |
| 3,153,993 | 10/1964 | Keppler | 404/117 |
| 3,221,619 | 12/1965 | Erickson | 404/122 X |
| 3,516,341 | 6/1970 | Olsen | 404/103 |

*Primary Examiner*—Nile C. Byers, Jr.
*Attorney, Agent, or Firm*—Brumbaugh, Graves, Donohue & Raymond

[57] ABSTRACT

A road roller comprises a frame and a pair of drums, at least one of which is a guide drum, on which the frame is pivotally supported. A steering mechanism is attached to the guide drum for steering the road roller. The supporting mechanism for the guide drum includes a vertical pivot shaft coupled to the guide drum, a vertical anti-friction bearing on the pivot shaft for permitting the guide drum to pivot horizontally relative to the frame, and a flexible support coupled between the bearing and the frame for permitting limited lateral twisting of the guide drum relative to the frame. The flexible support comprises a pair of longitudinally spaced rubber mounts for absorbing longitudinal shocks but for inhibiting longitudinal twisting of the drum relative to the frame.

10 Claims, 3 Drawing Figures

RESILIENTLY MOUNTED STEERING YOKE FOR ROAD ROLLER

BACKGROUND OF THE INVENTION

The present invention is a new and improved support and steering arrangement for a road roller of the type having a pair of drums, at least one of which is a guide drum pivotable in a horizontal plane for steering the roller.

The steering drum of road rollers is attached to the frame to be pivotable in a horizontal plane relative to the frame, but is normally rigidly attached vertically. The attachment between the guide drum and frame using a king pin, bearings and related hardware, while providing a solid assembly, is not always desirable since impact forces can be imparted to the drum and thence to the frame during operation.

SUMMARY OF THE INVENTION

A guide drum support steering arrangement according to the present invention provides the same secure pivotable attachment between the guide drum and the frame as in prior art road rollers, with the resulting solid roller assembly, but with a greatly simplified and uncomplicated structure which permits a tilting of the guide drum relative to the frame, and a shock absorbing longitudinal resilient mounting. The support and steering arrangement is especially well suited for road rollers, where maneuverability and a short turning radius are important.

In accordance with the present invention, the guide drum is mounted on a steering yoke, with a pivot shaft attached to the yoke and extending vertically therefrom. A pair of anti-friction discs are arranged on the pivot shaft and support a longitudinally elongated support plate. A pair of longitudinally spaced resilient supports, in turn, are mounted on the support plate and carry the frame.

The pair of anti-friction discs act as vertical bearings between the guide drum and the frame, and permit the drum to pivot relative to the frame. The longitudinally spaced resilient supports permit tilting movement of the drum relative to the frame and also absorb impact shocks generated when the roller encounters obstacles, rather than transmitting the shocks directly to the frame.

For a better understanding of the invention, reference is made to the following detailed description and the drawings accompanying the application.

DETAILED DESCRIPTION OF THE PREFERRED EMBODIMENT

A road roller according to the present invention includes generally a vibratory rear drum 10 and a front guide drum 12 supporting a frame 14.

The guide drum 12 is pivotally mounted to the frame for steering the vehicle, as described below. The vibratory drum 10, connected to the rear of the frame 14, is driven at oscillating frequency in a known manner to increase the compression capabilities of the roller. A vibratory drum of this type is currently commercially sold by the Assignee of the present invention as Dynapac Model CG-09. The vibratory drum, however, forms no part of the invention and will thus not be described further herein.

Figure 1:
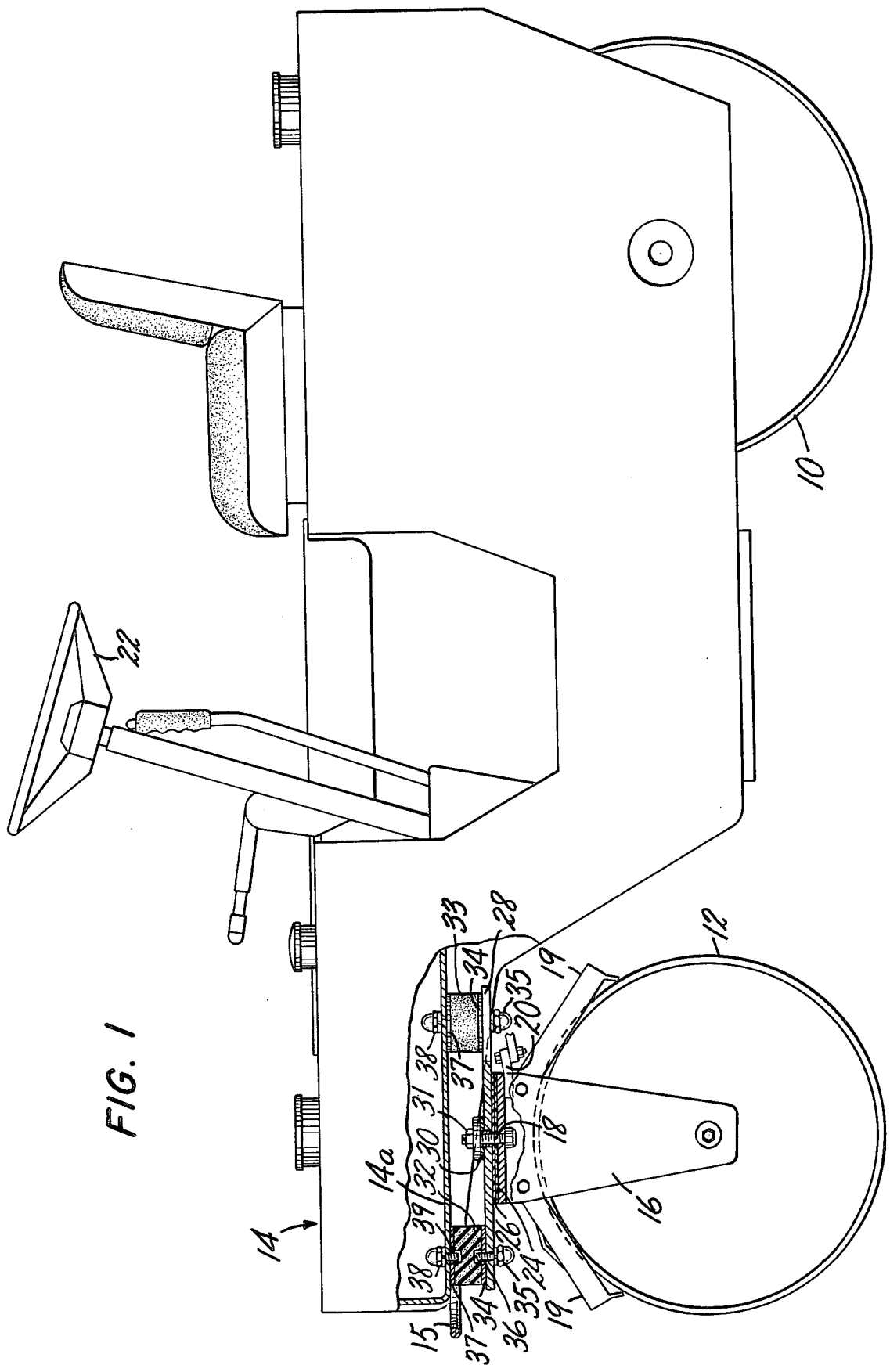
FIG. 1 illustrates a road roller according to the present invention, with the supporting mechanism partially broken away for clarity.
Figure 2:
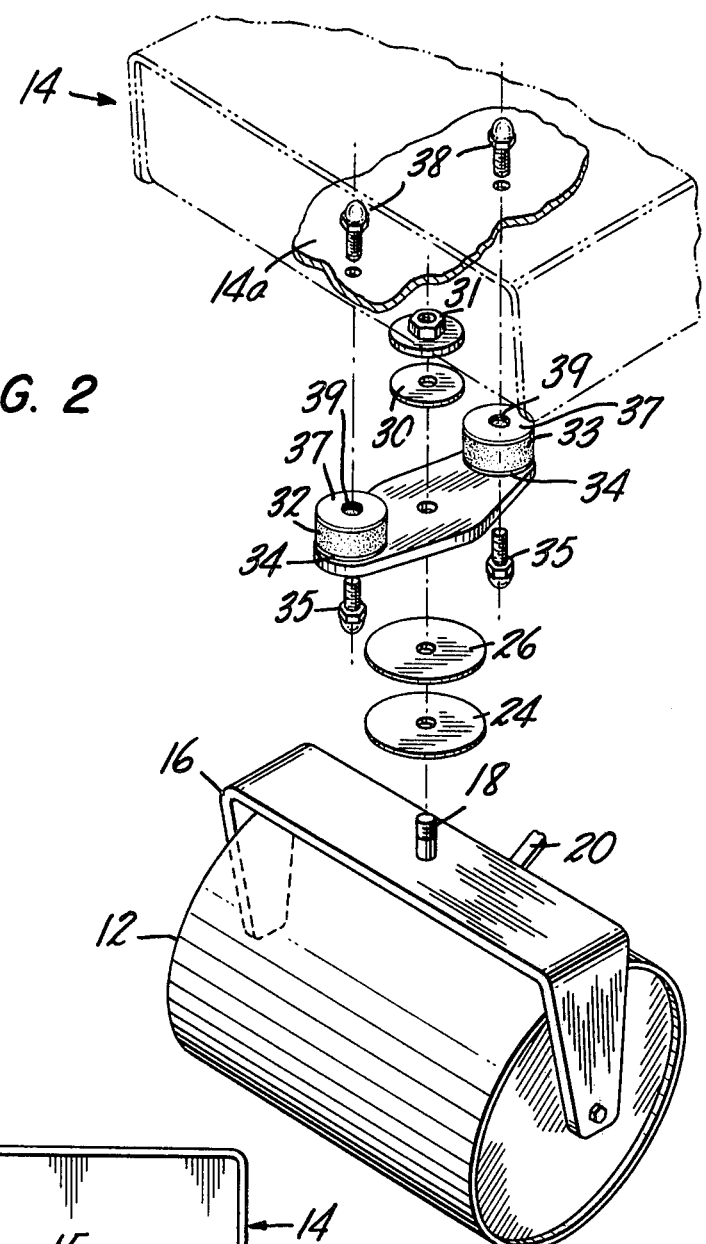
FIG. 2 is an exploded perspective view of the parts constituting the support mechanism according to the present invention.

The guide drum 12 supports a steering yoke 16, which has a pivot shaft 18 extending vertically therefrom. The yoke 16 also supports a pair of scrapers 19 spring loaded against the drum 12 (FIG. 1). A steering link 20 connects the steering yoke 16 and a ball joint to the steering wheel mechanism 22 for pivoting the guide drum 12 horizontally about the pivot shaft axis.

The pivot shaft 18 carries a vertical bearing in the form of a pair of plastic anti-friction discs 24, 26 to provide a horizontal pivoting bearing surface between the yoke 16 and the frame 14. The upper disc 26 supports a longitudinally elongated support plate 28. The support plate 28 is mounted to the assembly between the upper anti-friction plate 26 and a third anti-friction bearing plate 30 which is secured to the pivot shaft by a washer and nut assembly 31. When assembled on the yoke 16, the anti-friction bearing plates 24, 26, and 30 allow the pivot shaft 18, yoke 16, and thus the drum 12 to pivot freely relative to the support plate 28.

A pair of longitudinally spaced resilient rubber mounts 32 and 33 are carried by the support plate 28 and support the frame. A pair of upper and lower metal discs, 34 and 37, are adhesively fastened to each rubber mount 32, 33. Each of the lower discs 34 has a threaded opening 36 (FIG. 1) to receive a hex-head cap screw 35 to secure the rubber mounts to the plate 28. Each of the upper discs 37 also has a threaded opening 39 to receive another hex-head cap screw 38 to secure the rubber mounts 32, 33 to the flat plate 14a (which may also carry a tow eye 15) of the frame 14.

Figure 3:
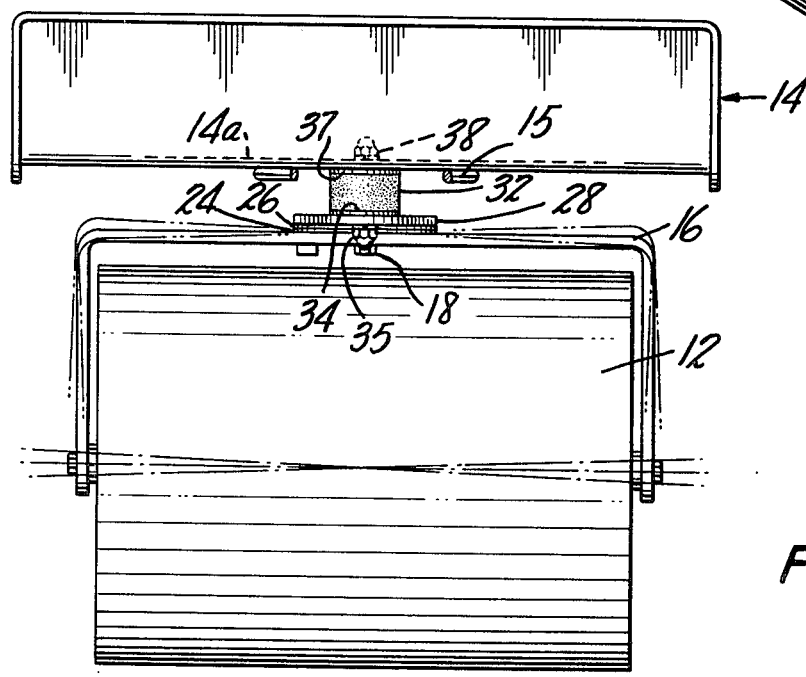
FIG. 3 is a front view of a road roller, illustrating a portion of the frame, the guide drum, and the support mechanism.

The spaced rubber mounts 32 and 33 act to support the guide drum 12 resiliently and thus permit tilting of the drum around a longitudinal axis (FIG. 3) and, at the same time, absorb shocks should the roller encounter an obstacle, for example, a curb stone. In so doing, the resilient mounts protect the frame from impact shocks.

When a road roller includes two steerable drums, the inventive resilient yoke mounting can be used with each of the steerable drums.

The invention has been described above with reference to the preferred embodiment thereof. Variations and modifications of this embodiment, without departing from the inventive principles disclosed herein, will be apparent to those skilled in the art. All such modifications and variations are intended to be within the scope of the present invention, as defined in the following claims.

I claim:

1. In a road roller having a frame, a pair of longitudinally spaced drums, at least one of which is a guide drum, means for supporting the frame on the drums including means for pivotally supporting the frame on the guide drum, and steering means for pivoting the guide drum for steering the road roller, the improvement wherein the guide drum supporting means comprises a vertical pivot means coupled to the guide drum, vertical anti-friction bearing means on the pivot means for permitting the guide drum to pivot horizontally relative to the frame, and flexible support means coupled between the bearing means and the frame and including two longitudinally spaced resilient supports for permitting the tilting of the guide drum relative to the frame around the longitudinal axis and absorbing impact shocks generated by the guide roller when encountering obstacles.

2. The improvement according to claim 1, wherein the other of the pair of drums is also a guide drum, means for pivotally supporting the frame on the second guide drum, said second guide drum supporting means comprising a vertical pivot means coupled to the second guide drum, vertical anti-friction bearing means on the pivot means for permitting the guide drum to pivot horizontally relative to the frame, and flexible support means coupled between the bearing means and the frame and including two longitudinally spaced resilient supports for permitting tilting of the second guide drum relative to the frame and absorbing impact shocks generated by the guide roller when encountering obstacles.

3. The improvement according to claim 1 or 2, wherein the guide drum supports a steering yoke, the pivot means comprises a pivot shaft attached to the yoke and extending vertically therefrom, and the vertical anti-friction bearing means comprises a pair of anti-friction discs on the pivot shaft.

4. The improvement according to claim 3, comprising a longitudinally elongated support plate pivotally mounted on the shaft above the pair of anti-friction discs and supported vertically by the discs, and wherein the resilient supports are mounted on the plate.

5. The improvement according to claim 4, wherein the plate is supported on the pivot shaft between the upper anti-friction disc and a third anti-friction disc, and comprising means for securing in the vertical direction the third disc to the shaft.

6. The improvement according to claim 5, wherein the anti-friction discs are plastic.

7. The improvement according to claim 1 or 2, wherein the resilient supports are rubber mounts.

8. The improvement according to claim 4, wherein the resilient supports are rubber mounts.

9. The improvement according to claim 5, wherein the resilient supports are rubber mounts.

10. The improvement according to claim 6, wherein the resilient supports are rubber mounts.

* * * * *